Figure 1:
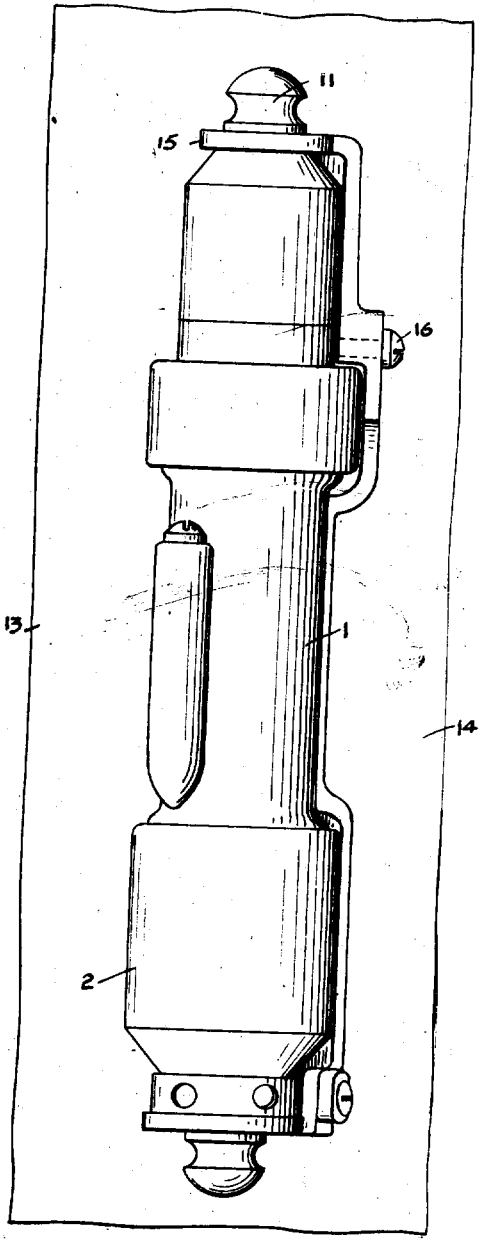

E. FRANCKAERTS.

CHECK HINGE.

APPLICATION FILED NOV. 22, 1919.

Reissued Apr. 12, 1921.

15,082.

3 SHEETS—SHEET 1.

INVENTOR
E. FRANCKAERTS

BY

ATT'Y.

E. FRANCKAERTS.

CHECK HINGE.

APPLICATION FILED NOV. 22, 1919.

Reissued Apr. 12, 1921.

15,082

3 SHEETS—SHEET 2.

INVENTOR
E. FRANCKAERTS

BY

ATT'Y

E. FRANCKAERTS.

CHECK HINGE.

APPLICATION FILED NOV. 22, 1919.

Reissued Apr. 12, 1921.

15,082.

3 SHEETS—SHEET 3.

INVENTOR
E. FRANCKAERTS

BY

ATTY

UNITED STATES PATENT OFFICE.

EMILE FRANCKAERTS, OF SAN FRANCISCO, CALIFORNIA.

CHECK-HINGE.

15,082. Specification of Reissued Letters Patent. Reissued Apr. 12, 1921.

Original No. 1,281,774, dated October 15, 1918, Serial No. 187,904, filed August 23, 1917. Application for reissue filed November 22, 1919. Serial No. 339,962.

*To all whom it may concern:*

Be it known that I, EMILE FRANCKAERTS, a citizen of the United States, and a resident of San Francisco, in the county of San Francisco and State of California, have invented new and useful Improvements in Check-Hinges, of which the following is a specification.

My invention is an improvement in check hinges, and has for its object to provide a hinge of the character specified, which will automatically close the door when it has been opened and released, and wherein checking mechanism is provided for cushioning the closing movement of the door.

Figure 3:
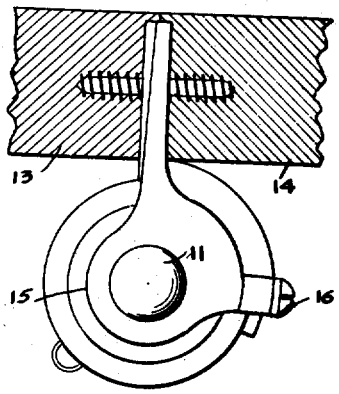
Figure 10:
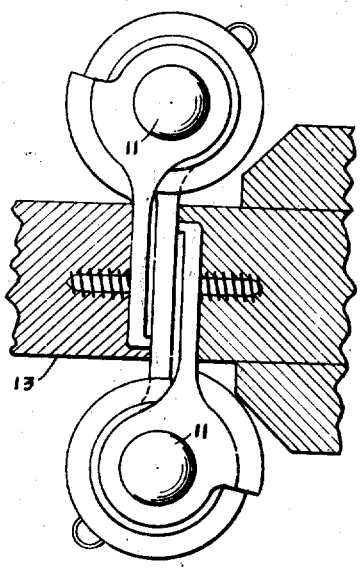
Figure 2:
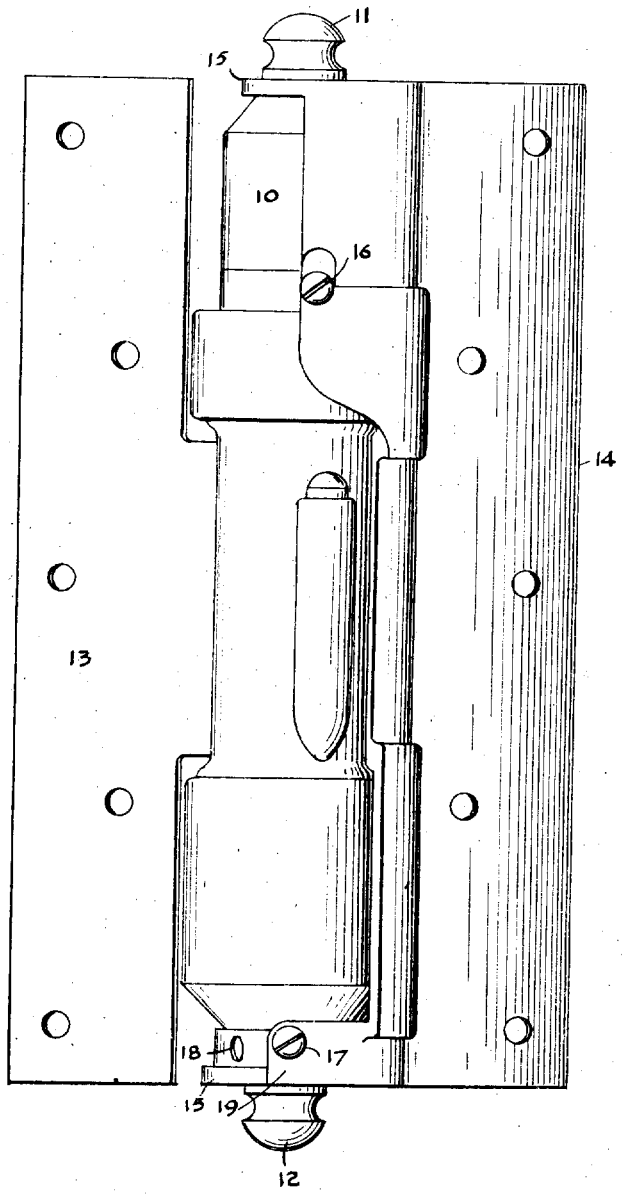
Figure 6:
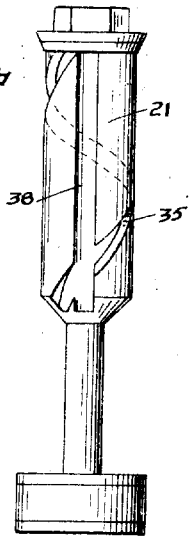
Figure 7:
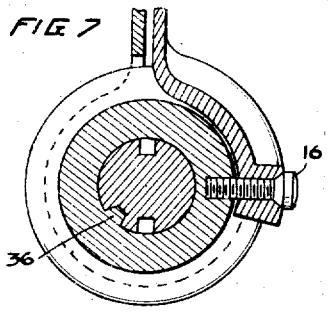
Figure 8:
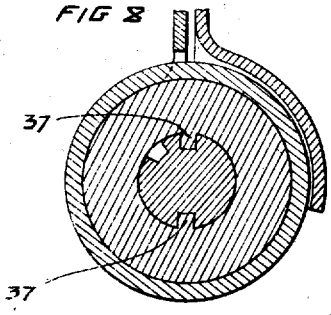
Figure 4:
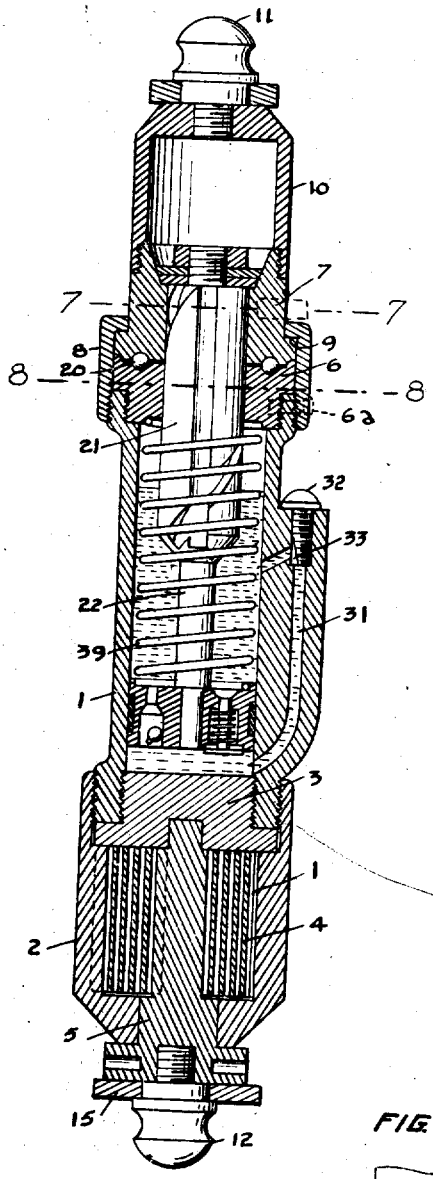
Figure 3:
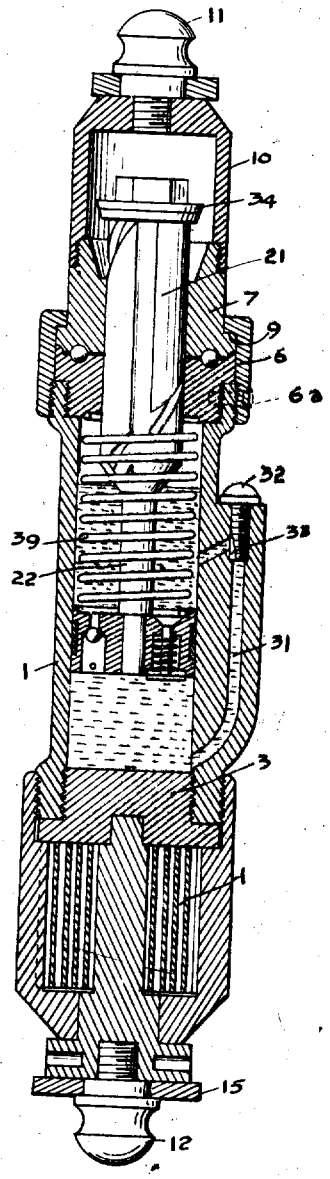
Figure 9:
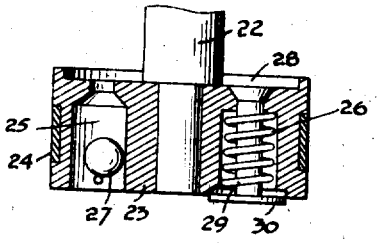

In the drawings:

Figure 1 is a front view of the improved hinge, showing the parts in one position; Fig. 2 is a similar view showing the parts in another position; Fig. 3 is a top plan view; Fig. 4 is a longitudinal section, with the parts in one position; Fig. 5 is a similar view with the parts in another position; Fig. 6 is a front view of the plunger; Figs. 7 and 8 are sections on the lines 7—7 and 8—8 of Fig. 4; Fig. 9 is an enlarged vertical section of the piston; Fig. 10 is a top plan view of a modified construction for permitting the door to swing in either direction.

In the embodiment of the invention shown in Figs. 1 to 9, inclusive, the hinge consists of a casing composed of a section 1 forming a chamber for liquid, having connected with the lower end thereof a section 2 forming a chamber for holding the spring which closes the door, the said section having threaded engagement with the section 1. A partition plate or disk 3 is threaded into the lower end of the section 1, separating the said section from the section 2, and the spring 4 is connected at one end with the section 2 and at the other with a rotatable pin 5 which is journaled in the lower end of the section and in the partition 3.

Collars 6 and 7 are arranged above the section 1, the collar 6 having threaded engagement with the enlarged upper end of the section 1, and the collar 7 which is arranged above the collar 6 and is journaled to rotate with respect thereto is held to the collar 6 by means of a flanged sleeve 8 which has threaded engagement with the upper end of the section 1, and the flange extends inwardly over an annular shoulder 9 on the collar 7.

A cap 10 has threaded engagement with the upper end of the collar 7, and screws 11 and 12 are threaded into the outer ends of the cap 10 and pin 5, respectively. One of the hinge leaves 13 is secured to the section 1 of the casing, and the other leaf 14 is detachably connected with the cap 10 and with the pin 5 by means of the screws 11 and 12. Referring to Fig. 2 it will be noticed that the leaf 14 has laterally extending lugs 15 at its ends which engage the ends of the cap and the pin 5, these lugs having openings through which the screws 11 and 12 extend. In order to hold the hinge leaf in proper position with respect to the cap and pin, screws 16 and 17 are passed through the leaf into engagement with the collar 7 and the pin 5, respectively. It will be noticed that the pin has a head outside the section 2, and this head has radial openings 18 which may be engaged by an instrument to turn the pin to properly tension the spring. The screw 17 engages one of these openings, passing through a lug 19 from the leaf 14.

A ball bearing 20 is arranged between the collars 6 and 7 and a plunger rod 21 is mounted to slide in the two collars. This rod has its lower end reduced as shown at 22, and a piston 23 is connected with the said lower end. This piston has a ring 24 for making a tight joint in the section of the casing, and two ports 25 and 26 are provided in the piston for permitting the passage of the liquid which is held in the chamber. One of these ports is controlled by a ball check valve 27, which is adapted to close the port when the piston moves downward, and the port 26 is provided with a relief valve 28 which is normally held closed by a spring 29.

It will be noticed that the upper end of the valve 28 is conical or tapered and cooperates with a similarly shaped seat, while the lower end of the valve is provided with a head 30 fitting into a rabbet or counterbore at the lower end of the piston. The spring 29 is arranged between the head and the piston and normally holds the valve closed. A by-pass 31 is provided in the wall of the section 1, the said pass leading from the lower end of the chamber to near the upper end, and a valve is provided for varying the capacity of the by-pass, the said valve 32 being screw threaded into the upper end of the passage 31 and having a groove or passage 33 through which the liquid may pass.

When the piston moves downwardly, the port 25 is closed by the check valve 27, and the liquid must pass by way of the by-pass from below the piston to above the same. The downward movement of the piston will thus be checked and cushioned.

A stop 34 is provided at the upper end of the rod 21 for limiting the downward movement of the piston to the position shown in Fig. 4, the said stop being in the form of washers held to the upper end of the rod by a nut and adapted to engage an annular shoulder formed by counterboring the upper end of the collar 7. The plunger rod 21 has a spiral groove 35, which is adapted to be engaged by a lug 36 in the counterbore of the collar 7 to constrain the plunger to move downwardly when the collar is rotated, and the plunger is prevented from turning with the collar 7 by means of lugs 37 which engage within vertical grooves 39 in the plunger rod. A coil spring 39 is arranged between the upper face of the plunger and the lower end of the collar 6, the said spring acting to move the plunger and the piston upwardly.

In operation, when the door is open the parts are in the position of Fig. 5, the spring 4 being under compression and the plunger being lifted. The opening of the door lifts the plunger, and when the door is closed by the spring 4, the plunger is forced downwardly because of the spiral groove, and since the check valve 27 is closed the liquid which must pass by way of the by-pass is limited and the movement of the door closing will be cushioned. Should the door be forcibly closed, the valve 28 may yield to prevent injury to the parts.

It will be noted that a screw 6[a] is passed through the sleeve 8 and the flange of the casing section 1 into engagement with the collar 6, to prevent the collar 6 and the sleeve 8 from turning with respect to each other.

I claim:

1. In a hinge, a casing having a chamber for liquid, a piston movable in the casing and having a check valve for permitting the liquid to flow freely in one direction, said casing having a by-pass for the liquid and means outside the casing for controlling the by-pass, a spring acting normally to move the piston in the said one direction, a rotatable element in connection with the hinge at one end thereof and connected to the piston to move the piston against the resistance of the spring, said piston having a relief valve, spring controlled to yield at a predetermined pressure when the check valve is closed, a rotatable element in connection with the hinge at the other end, and a closing spring in the casing and connected with the casing and the last named rotatable element.

2. In a hinge, a casing having a chamber for liquid, a piston movable in the casing and having a check valve for permitting the liquid to flow freely in one direction, said casing having a by-pass for the liquid and means outside the casing for controlling the by-pass, a spring acting normally to move the piston in the said one direction, and a rotatable element in connection with the hinge at one end thereof and connected to the piston to move the piston against the resistance of the spring, said piston having a relief valve, spring controlled to yield at a predetermined pressure when the check valve is closed.

3. In a hinge, a casing having a chamber for liquid, a piston movable in the casing, and having a check-valve for permitting the liquid to flow freely in one direction, said casing having a by-pass for the liquid, a rotatable element in connection with the hinge and connected to the piston to move the piston, and a flanged sleeve having a threaded engagement with said casing and a flange engaging a shoulder on said rotatable element.

4. A check hinge comprising hinge leaves adapted to be secured to a door and the jamb therefor, a casing with which one of said leaves is rigidly connected, a spring housing rotatable upon said casing and connected with the door hinge leaf, a spring housing fixed to said casing, a spring in said last named housing, a member in said housing connected with and adapted to be rotated by said spring, means for connecting said member with the door hinge leaf and means to retard closing movement of the door mounted in the casing, and operatively associated with the first named spring housing, said last named means including a plunger provided with vertically extending helical grooves crossing each other and lugs movable with said rotatable housing and entering said grooves.

EMILE FRANCKAERTS.